United States Patent [19]

Behrens et al.

[11] Patent Number: 4,717,182
[45] Date of Patent: Jan. 5, 1988

[54] PLASTIC COUPLING SLEEVE FOR PIPES

[75] Inventors: Uwe Behrens, Frechen; Willi Keul, Kerpen-Brüggen, both of Fed. Rep. of Germany

[73] Assignee: Rheinische Braunkohlenwerke AG, Fed. Rep. of Germany

[21] Appl. No.: 861,061

[22] Filed: May 8, 1986

[30] Foreign Application Priority Data

May 10, 1985 [DE] Fed. Rep. of Germany ....... 3516814

[51] Int. Cl.⁴ .............................................. F16L 49/00
[52] U.S. Cl. .................................... 285/230; 285/235; 285/369
[58] Field of Search ................. 285/53, 235, 230, 292, 285/349, 369, 305, 417

[56] References Cited

U.S. PATENT DOCUMENTS

| 2,038,870 | 4/1936 | Rader et al. | 285/117 |
| 2,458,714 | 1/1949 | Mahoney | 285/97.3 |
| 2,597,482 | 5/1952 | Harrison et al. | 285/97.3 |
| 2,943,967 | 7/1960 | Simon | 154/83 |
| 3,284,110 | 11/1966 | Marcus et al. | 285/235 |
| 3,637,239 | 1/1972 | Daniel | 285/230 |
| 3,685,546 | 8/1972 | Sigmund | 285/369 |
| 3,759,554 | 9/1973 | Carter | 285/305 |
| 3,884,269 | 5/1975 | Schetty et al. | 138/137 |
| 4,023,835 | 5/1977 | Ewing et al. | 285/305 |
| 4,098,528 | 7/1978 | Stanley | 285/235 |

FOREIGN PATENT DOCUMENTS

| 1749276 | 4/1957 | Fed. Rep. of Germany . |
| 1182483 | 7/1965 | Fed. Rep. of Germany . |
| 54102 | 11/1967 | Fed. Rep. of Germany . |
| 2357260 | 5/1975 | Fed. Rep. of Germany ...... 285/305 |
| 2551386 | 11/1975 | Fed. Rep. of Germany . |
| 3136076 | 9/1981 | Fed. Rep. of Germany . |
| 2530370 | 11/1983 | Fed. Rep. of Germany . |
| 3225901 | 1/1984 | Fed. Rep. of Germany . |
| 7907516 | 4/1981 | Netherlands ........................ 285/369 |
| 401607 | 10/1965 | Switzerland . |
| 1329217 | 9/1973 | United Kingdom ................ 285/305 |
| 1366139 | 9/1974 | United Kingdom ................ 285/235 |
| 1582839 | 1/1981 | United Kingdom ................ 285/369 |

Primary Examiner—Randolph A. Reese
Assistant Examiner—Anthony Knight
Attorney, Agent, or Firm—Howson and Howson

[57] ABSTRACT

A substantially cylindrical coupling sleeve for producing a connection capable of resisting a tensile force between asbestos-cement pipes connected thereby comprises a carrier body portion of glass fiber roving cloth embedded in synthetic resin, with the maximum tensile strength oriented in the longitudinal direction of the sleeve. In the end regions, between a respective end face and an adjacent internal peripheral groove which co-operates with a groove on the pipe to accommodate a cable-like connecting member, the carrier body portion is externally wound with glass fiber rovings embedded in synthetic resin, with the maximum tensile strength oriented in the peripheral direction of the sleeve. The carrier body portion is of a cylindrical configuration with end regions which taper down to a reduced diameter. The internal peripheral groove is defined at the side towards the adjacent end face of the sleeve, in the region of the external winding therearound, by a lining layer of wedge-shaped cross-section and comprising glass fiber roving material embedded in plastic material with the maximum tensile strength oriented in the peripheral direction.

13 Claims, 3 Drawing Figures

PLASTIC COUPLING SLEEVE FOR PIPES

BACKGROUND OF THE INVENTION

Pipes consisting of asbestos cement for lining a shaft such as a well shaft typically have nominal diameters of between 800 and 2000 mm, while being up to 10 meters in length. A multiplicity of pipes of that nature are fitted together to form a pipe string, and let down into the well shaft. The connection between the individual pipes making up the pipe string is made by way of respective coupling sleeves which fit around the outside of the ends of the pipes which are adjacent to each other in regard to their end faces. The coupling sleeves which are substantially cylindrical have at least one internal peripheral groove which thus faces towards the external peripheral surface of the respective pipe end portion. German laid-open application (DE-OS) No. 32 25 901 discloses a form of pipe connection which is resistant to tensile forces acting along the line of the pipes, in which one of the two pipes which are to be joined together by the pipe connection is provided adjacent at least one of the ends thereof and on the outside thereof with a respective connecting ring consisting of glass fiber-reinforced plastic material. The two pipes are connected together by way of the connecting ring, by means of a sleeve-like member which fits over at least one pipe end and which has a peripheral groove in its internal surface. The glass fiber-reinforced plastic ring is provided with a corresponding peripheral groove in its external surface. In the coupling position therefore the internal peripheral groove in the sleeve-like member co-operates with the external peripheral groove in the ring to form an annular passage into which a flexible coupling member in the form of a rope or cable can be inserted. The rope or cable coupled member is fitted into the annular passage by way of a tangential bore which opens into the annular passage and which is provided in the sleeve-like member.

With that arrangement, a force acting on the interconnected pipes in the longitudinal direction thereof is transmitted to the sleeve-like member by way of the coupling member, namely the rope or cable in the annular passage, and from there is transmitted to the adjacent pipe by way of a second rope or cable coupling member of another pipe connection which is formed in the same manner. The sleeve-like coupling member has a casing of asbestos cement which is internally lined with glass fiber rovings or glass fiber roving cloths which are embedded in synthetic resin and which provide the internal peripheral grooves required for receiving the coupling rope or cable, possibly together with further peripheral grooves that may be required for receiving one or more sealing rings.

As will be appreciated, the fact that the longitudinal forces acting in the respective pipes are transmitted from the ring at the end of the respective pipe by way of the coupling rope or cable and the coupling sleeve gives rise at the rope or cable to force components which are directed radially inwardly in the case of the coupling ring on the pipe and radially outwardly in the case of the coupling sleeve. The radially outwardly directed components require the coupling sleeve to have a wall portion which is sufficiently strong to ensure that the sleeve is not broken open radially over a part of the axial or longitudinal extent thereof. In the known coupling sleeve referred to above, the wall portion of the sleeve is strengthened by means of an asbestos-cement casing forming part of the sleeve structure.

However, the coupling sleeves which include the asbestos-cement casing are comparatively high in weight, which means that it is necessary to use suitable lifting equipment or a suitably large labor force, for the purposes of handling the coupling sleeves.

SUMMARY OF THE INVENTION

An object of the present invention is to provide a coupling sleeve for interconnecting first and second pipes, which sleeve is of reduced weight while being of enhanced strength in those areas thereof in which the highest levels of radial forces occur.

Another object of the present invention is to provide a coupling sleeve for connecting pipes together in mutually aligned relationship, which can be fitted in position without the use of complex or burdensome equipment.

Yet another object of the present invention is to provide a coupling sleeve for interconnecting pipes of asbestos cement, which is of a specific design configuration adapted to enhance the strength thereof selectively as required at various locations thereof.

A further object of the present invention is to provide a pipe coupling sleeve which can be of lighter weight but of greater strength than previous sleeve designs.

Still another object of the present invention is to provide a pipe coupling sleeve which while being of adequate strength and light weight is nonetheless still simple to produce.

These and other objects are attained by a coupling sleeve which is of a substantially cylindrical configuration and which has at least one inner peripheral groove therein and a bore or passage which communicates with the at least one peripheral groove and which extends outwardly therefrom in at least substantially tangential relationship to the coupling sleeve, for the introduction of a flexible coupling member of rope-like or cable-like nature, for producing a connection which is resistant to compression and tensile forces acting in the longitudinal direction of assembled pipes consisting of asbestos cement, the connection being made by way of a coupling ring which is for example of plastic material and which is fixedly connected to the end of a respective pipe. The coupling ring is provided with a peripheral groove in its external surface, which, in the assembled condition of the ring and the sleeve, co-operates with the internal peripheral groove of the coupling sleeve to form a passage for the flexible coupling member to engage therein. The coupling sleeve comprises a carrier body portion of glass fiber roving cloth which is embedded in synthetic resin and whose greatest tensile strength is oriented in the longitudinal direction of the coupling sleeve, while at least in the region of the at least one internal peripheral groove, glass fiber roving material which is embedded in synthetic resin is wound around the outside of the carrier body portion, with the greatest tensile strength of the glass fiber roving material around the carrier body portion being oriented in the peripheral direction of the coupling sleeve.

The arrangement in accordance with the principles of the present invention, as set forth above, besides providing for a considerable increase in the strength of the coupling sleeve in the longitudinal and peripheral directions, also at least restricts the possibility of the coupling sleeve bursting or cracking under the effect of radial forces, as referred to above. Furthermore, besides increasing the strength of the coupling sleeve, the configuration according to the invention also provides for a reduction in the weight thereof so that even when the coupling sleeve is of substantial diameter, it can still be handled by a single worker. At the same time, the sleeve configuration according to the invention provides for a reduction in the manufacturing costs of glass fiber-reinforced plastic couplings as well as giving a further improvement in regard to the ageing properties of the glass fiber-reinforced plastic coupling sleeve, in comparison with the known coupling sleeve which consists of asbestos cement. The coupling sleeve is further advantageously improved by virtue of the change in the configuration thereof, in comparison with the known sleeves. Accordingly, the part of the sleeve which forms the carrier body portion thereof can be in the form of a cylinder which at least at one of the end regions thereof, is of smaller diameter than in the remaining part, thus forming a constriction portion or a region which tapers down. The constriction portion results in the outside casing configuration of the coupling sleeve being altered in such a way as to provide additional space which can be utilized to accommodate the reinforcing means that are required to enhance peripheral strength of the coupling sleeve, without that substantially increasing the outside diameter of the coupling sleeve. In that connection, it is sufficient for the region of the constriction portion, from the respective end face of the coupling sleeve to over the adjacent internal peripheral groove in the carrier body portion of the coupling sleeve, to be wound around with glass fiber rovings which are embedded in synthetic resin and the greatest tensile strength of which is oriented in the peripheral direction of the coupling sleeve. That sleeve construction reinforces essentially only those parts of the coupling sleeve which are actually in need of reinforcement so that the other outside peripheral regions of the sleeve can be filled with a material which does not substantially increase the weight of the sleeve. However, as an alternative construction, those regions which are not in need of reinforcement in the above-indicated manner could also remain unfilled.

In an advantageous aspect of the present invention, at least in portions of the inside periphery of the coupling sleeve, the sleeve is provided with a lining or cladding layer which extends therearound and in which the internal peripheral groove is provided. In that arrangement in accordance with the teachings of the invention, the internal peripheral groove, at its side which is towards the adjacent end face of the coupling sleeve, may be delimited by a portion of the lining layer which is of a wedge-shaped configuration when considered in section in the longitudinal direction of the coupling sleeve; the lining layer is advantageously formed by glass fiber rovings which are embedded in synthetic resin and whose greatest tensile strength is oriented in the peripheral direction. The annular space which is substantially wedge-shaped in longitudinal section of the coupling sleeve and which extends around the inside peripheral surface thereof, for receiving the above-mentioned wedge-shaped portion of the lining layer, is formed when the carrier body portion of the coupling sleeve is of smaller diameter at each of its two end regions, that is to say, the internal surface of the sleeve tapers inwardly from the region of the internal peripheral groove, towards the adjacent end face of the coupling sleeve.

As indicated above, the annular space of wedge-shaped configuration thus forms a wedge portion with the tip of the wedge configuration pointing towards the adjacent end face of the coupling sleeve. When the pipes connected by the coupling sleeve are subjected to a loading in the longitudinal direction, with the result that the coupling sleeve is also loaded in the longitudinal direction thereof, the wedge-shaped portion, under the effect of the flexible coupling member such as a rope or cable which is disposed in the annular passage formed by the internal peripheral groove on the coupling sleeve and the external peripheral groove on the connecting ring, has a tendency radially to expand the constricted end region of the carrier body portion. The external jacketing around the end regions of the carrier body portion, comprising the peripherally directed glass fiber rovings, puts up such a high resistance to that radial expansion tendency on the part of the above-mentioned wedge-shaped portion, that the coupling can withstand any loadings likely to be encountered in use thereof. That configuration provides that the axial forces are transmitted to the layer forming the carrier body portion, without such forces being carried by way of layers of material which are glued in position, thus giving the advantage that the forces are transmitted between the various constituents of the sleeve in a virtually direct fashion, which thus has the effect of further enhancing the strength and integrity thereof.

The carrier body portion may be surrounded on its outside by a filling means which extends between the end regions around which the glass fiber rovings are wound. The filling means advantageously comprises polystyrene foam which is distinguished by virtue of being of particularly low weight. To protect the comparatively soft filling material, it is advantageously encased on its outside at least by a coherent layer of glass fiber-reinforced plastic material. That layer protects the filling material from damage, the ingress of moisture and dirt. Advantageously, the layer which externally encases the filling material may be part of an external layer of the whole coupling sleeve. In that arrangement, it is desirable for the glass fiber rovings which are used for reinforcing the end regions of the sleeve and which have a particularly high level of tensile strength in the peripheral direction, to be wound, for the sake of simplicity of construction, as an external layer over the entire coupling sleeve.

In another advantageous aspect of the invention, the coupling sleeve may also include at least one further peripheral groove which is disposed adjacent to the internal peripheral groove that is provided for accommodating the flexible coupling member or cable, the at least one further peripheral groove serving to accommodate a sealing ring. The further peripheral groove or grooves is or are advantageously disposed in the lining layer in the region between the internal peripheral groove for the coupling element or cable, and the center of the coupling sleeve. In that region, the lining layer is not subjected to any particular operational requirements or demands so that in the area it may possibly also be of lower strength than the remainder of the sleeve and can thus be produced at lower cost. The thickness of the internal lining layer advantageously approximately corresponds to the amount by which the diameter of the end regions of the carrier body portion is reduced. In that way the intermediate layer in the coupling sleeve structure according to the invention forms an internal support for the carrier body portion, to withstand in particular a local buckling or swelling pressure.

Further objects, features and advantages of the structure of the coupling sleeve in accordance with the principles of the present invention will become apparent from the following description of a preferred embodiment thereof.

BREIF DESCRIPTION OF THE DRAWINGS

FIG. 1 is a view, partly in longitudinal section, of a coupling sleeve according to the invention, which is not shown to scale, FIG. 2 shows the outside of the coupling sleeve of FIG. 1, on a reduced scale, and FIG. 3 is a view of the FIG. 2 coupling sleeve in section taken along line III—III in FIG. 2.

DESCRIPTION OF THE PREFERRED EMBODIMENT

Figure 1:
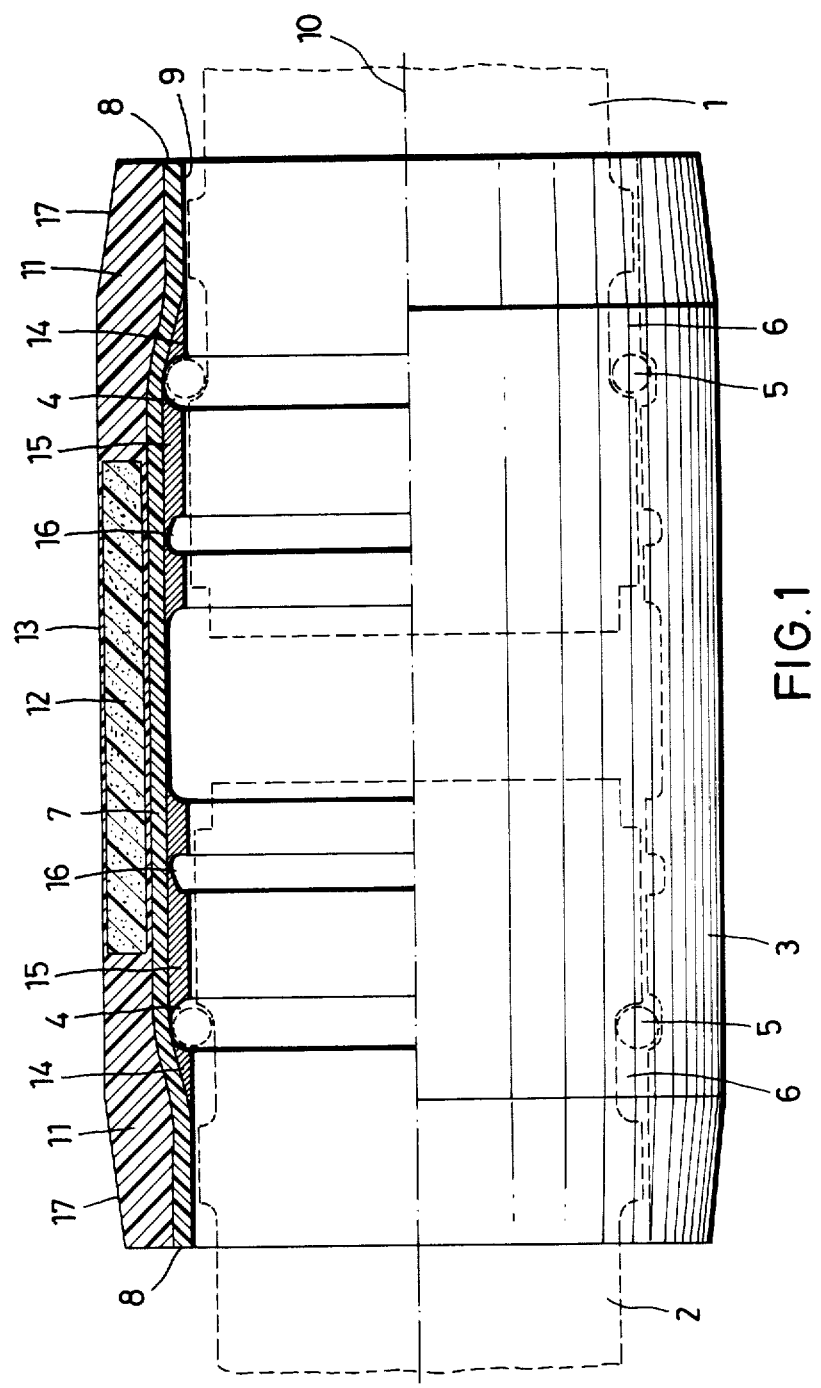

Referring firstly to FIG. 1, shown therein in phantom form are end portions 1 and 2 of first and second pipes such as asbestos-cement pipes which are to be connected together in such a way that the connection is resistant to compression and tensile forces in the longitudinal direction of the pipes, for use for example in a well shaft. The pipe end portions 1 and 2 are shown in the condition of being connected together, in mutually aligned relationship with their free end faces facing towards each other, by way of a coupling sleeve which is indicated generally by reference numeral 3. The coupling sleeve 3 which is largely composed of plastic material is provided with first and second internal peripheral grooves as indicated at 4. Each of the internal peripheral grooves 4 is disposed between the center of the coupling sleeve 3, as considered in the longitudinal or axial direction thereof, and the respective end faces of the coupling sleeve.

In the connected condition of the pipe end portions 1 and 2 with the coupling sleeve 3, disposed in opposite relationship to the internal peripheral grooves 4 in the coupling sleeve 3 are external peripheral grooves 6 which extend around the outside surfaces of the respective pipe end portions 1 and 2, so that the inner and outer peripheral grooves 4 and 6 co-operate with each other to provide an annular duct or passage which serves to accommodate a flexible connecting member shown in the form of a cable or rope 5. The term cable will be used for the sake of simplicity in this specification, to denote an appropriate flexible coupling member as indicated at 5, to secure the pipe end portions 1 and 2 and the coupling sleeve 3 together in the assembled condition, as will become apparent hereinafter.

The pipe end portions 1 and 2 are each provided with a respective coupling ring (not shown in the drawing) which comprises glass fiber-reinforced plastic material, with the grooves 6.

Referring still to FIG. 1, the coupling sleeve 3 comprises a substantially cylindrical carrier body portion 7 having ends 8 which are of smaller diameter than the remainder of the carrier body portion 7. The reduced-diameter configuration of the carrier body portion 7 at the respective end regions of the coupling sleeve can be clearly seen from FIG. 1. A thin lining or cladding layer within the cylindrical carrier body portion 7 delimits the internal peripheral grooves 4, along the apex region thereof. The inside diameter of the end faces 8 of the carrier body portion and the respective adjoining end regions thereof, such diameter being indicated by reference numeral 9 in FIG. 1, corresponds to the inside diameter or width of the bore defined by the coupling sleeve 3. The carrier body portion 7 comprises a glass fiber roving cloth of a basket weave nature, with the greatest tearing or tensile strength thereof being oriented in the longitudinal direction of the coupling sleeve 3, as indicated at 10 in FIG. 1. The tensile strength of the glass fiber roving cloth in the direction of the longitudinal axis 10 of the coupling sleeve 3 is 1800 N/cm while the tensile strength thereof in the other direction, namely the peripheral direction of the coupling sleeve 3, is 100 N/cm. It will be appreciated that those values are given by way of example only.

When the outside diameter of the coupling sleeve 4 is for example 1000 mm, the carrier body portion 7 comprises for example approximately twenty layers or plies of glass fiber roving cloth, with a width of 550 mm, which is embedded in synthetic resin such as epoxy resin.

In the respective end regions 11 of the coupling sleeve 3, which is provided between the respective end face 8 and the internal peripheral groove 4 which is disposed adjacent thereto, a plurality of layers or plies or glass fiber rovings are wound around the outside of the carrier body portion 7. The greatest tensile strength of those glass fiber rovings is oriented in the peripheral direction of the coupling sleeve 3, being for example 4800 tex. The glass fiber rovings are again embedded in synthetic resin such as epoxy resin. When producing the windings around the end regions 11 of the coupling sleeve 3, it is important that the tensile stress in the rovings is kept at a uniform and sufficiently high value, during the winding operation.

Between the glass fiber-encased end regions 11 of the coupling sleeve 3, the carrier body portion 7 is encased on its outside by a portion 12 comprising for example polystyrene foam whose density is 30 g/dm$^3$. The outside closure layer or external casing portion of the coupling sleeve 3 is formed by a thin layer 13 which for the sake of simplicity is advantageously wound from the same glass fiber rovings as those which also wind around the end regions 11 of the coupling sleeve 3.

By virtue of its low weight, the filling portion 12 simultaneously imparts to the coupling sleeve 3 which is for example lowered into a well pipe or shaft, a buoyancy force which reduces the weight of the whole pipe string formed by a plurality of pipe portions interconnected by respective coupling sleeves.

Over parts of its internal periphery, the coupling sleeve 3 is also provided with a lining or cladding layer which is also wound from glass fiber-reinforced plastic material and which contains and defines the internal peripheral grooves 4. Thus, as can be clearly seen from FIG. 1, between the smaller-diameter end regions of the carrier body portion 7 and the side wall of each respective internal peripheral groove 4, being the side wall which is towards the respectively adjacent end face 8, the above-mentioned internal lining layer fills an annular space as indicated at 14, which is of generally triangular configuration as considered in the sectional view shown in FIG. 1, namely taken in longitudinal section of the coupling sleeve 3. That arrangement thus provides a wedge-shaped portion of glass fiber rovings saturated with and embedded in synthetic resin, with the greatest tensile strength of those rovings being oriented in the peripheral direction.

The oppositely disposed side wall of each internal peripheral groove 4, being therefore the side wall which is remote from the respectively adjacent end face 8, is formed by a portion 15 of the internal lining layer which is provided with a groove 16 for receiving for example a sealing ring (not shown) which is thus fitted between the coupling sleeve 3 and the respective pipe end portion 1 and 2. Although only one further groove 16 is shown in each half of the coupling sleeve 3 illustrated in FIG. 1, it would also be possible to provide a plurality of such grooves, as necessary. The portion 15 of the lining layer comprises glass fiber-reinforced plastic material, for example glass fiber rovings which are embedded in synthetic resin, with their greatest tensile strength being oriented in the peripheral direction, like the portion which fills the annular space 14. The two portions indicated at 14 and 15 may be wound jointly in a single working operation.

Furthermore, in the illustrated embodiment, the coupling sleeve 3 is provided at its end regions with bevel portions 17 on its external peripheral surface. The portions 17 on the one hand reduce the overall weight of the coupling sleeve and on the other hand they also make it easier for the coupling sleeve to be inserted into the borehole or well shaft.

Figure 2:
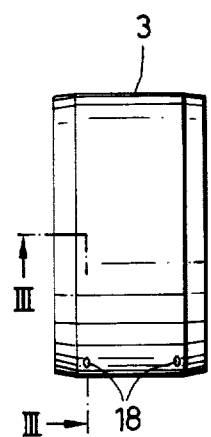
Figure 3:
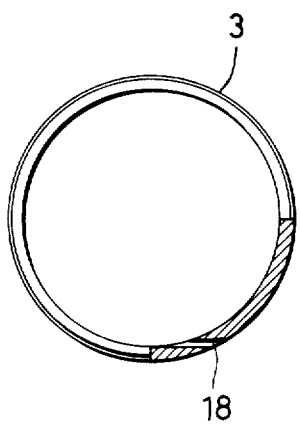

Reference should now also be made to FIGS. 2 and 3 showing that the coupling sleeve 3 is provided with bores 18 which extend to the outside of the coupling sleeve in at least substantially tangential relationship therewith. The bores 18 each communicate with the internal peripheral groove 4 in the coupling sleeve 3. As indicated above, the bores 18 are provided for insertion of the flexible coupling member 5 into the peripherally extending passage which is formed by the co-operation of a respective internal peripheral groove 4 and the external peripheral groove 6 on the respective pipe end portion 1 or 2. Thus, the pipe end portions 1 and 2 are put into the assembled condition in the coupling sleeve 3 as illustrated in FIG. 1, and then the flexible coupling member 5 is inserted through the bores 18 to take up the position shown in FIG. 1, whereby the pipe end portions 1 and 2 are held in their assembled position within the coupling sleeve 3. It will be seen that in the illustrated construction one of the grooves, being the groove 6 on the outside peripheral surface of the pipe end portions 1 and 2, is of an increased dimension in the longitudinal or axial direction of the pipe end portions 1, to permit relative movement thereof with respect to the coupling sleeve 3, to compensate for example for movements of the pipe end portions 1 and 2 relatively to the coupling sleeve 3 in the longitudinal direction thereof or to permit adjustment of the pipes relative to the coupling sleeve 3.

It will be appreciated that the above-described coupling sleeve construction was set forth only by way of example of the principles of the present invention and that various modifications and alterations may be made therein without thereby departing from the scope and spirit of the present invention.

What is claimed is:

1. A substantially cylindrical coupling sleeve said carrier body portion being a tubular member having first and second end regions and being of smaller diameter at at least one of said end regions than in the other part of said tubular member, of plastic material, for producing a connection between first and second pipes which is adapted to carry compression and tensile forces in the longitudinal direction of said pipes, said sleeve having at least one internal peripheral groove adapted to co-operate with an external peripheral groove provided on an end portion of a respective said pipe, to form a passage for accommodating a flexible elongate coupling member, and a passage means communicating with said at least one internal peripheral groove and extending outwardly through the sleeve in at least substantially tangential relationship therewith, for the introduction of said flexible coupling member into said passage, characterized by the fact that the sleeve comprises a carrier body portion of glass fiber roving cloth embedded in synthetic resin and whose greatest tensile strength is oriented in the longitudinal direction of the sleeve, and, wound around said carrier body portion on the outside thereof, at least in the region of said at least one internal peripheral groove, glass fiber roving material embedded in synthetic resin and whose greatest tensile strength is oriented in the peripheral direction of the sleeve.

2. A sleeve as set forth in claim 1 wherein at least said smaller-diameter end region which is disposed between the associated end face of the sleeve and the respectively adjacent internal peripheral groove is externally wound around the glass fiber rovings embedded in synthetic resin and whose greatest tensile strength is oriented in the peripheral direction.

3. A sleeve as set forth in claim 1 wherein said at least one internal peripheral groove is defined at its side towards the respectively adjacent end face of the sleeve by a lining layer located on the interior of the carrier body portion and having a wedge-shaped portion tapering toward the adjacent end face, said layer comprising wound glass fiber roving material embedded in synthetic resin and whose greatest tensile strength is oriented in the peripheral direction.

4. A sleeve as set forth in claim 1 wherein said at least one internal peripheral groove is defined at its side remote from the respectively adjacent end face of the sleeve by an internal lining layer, located on the interior of the carrier body portion, and formed by wound glass fiber roving material embedded in synthetic resin.

5. A sleeve as set forth in claim 1 wherein said at least one internal peripheral groove is defined at its side towards the respectively adjacent end face of the sleeve by a lining layer located on the interior of the carrier body portion and having a wedge-shaped portion tapering toward the adjacent end face, said layer comprising wound glass fiber roving material embedded in synthetic resin and whose greatest tensile strength is oriented in the peripheral direction and wherein said at least one internal peripheral groove is defined at its side remote from the respectively adjacent end face of the sleeve by an internal lining layer, located on the interior of the carrier body portion, and formed by wound glass fiber roving material embedded in synthetic resin.

6. A sleeve as set forth in claim 5 wherein said wedge-shaped portion and said internal lining layer are formed by the same lining layer.

7. A sleeve as set forth in claim 1 wherein said carrier body portion has first and second end regions having glass fiber rovings wound therearound and is externally surrounded by a filling means extending between said end regions.

8. A sleeve as set forth in claim 7 wherein said filling means is externally encased at least by a coherent layer of glass reinforced plastic material.

9. A sleeve as set forth in claim 7 wherein said filling means comprises plastic material.

10. A sleeve as set forth in claim 9 wherein said plastic material is a foam material.

11. A sleeve as set forth in claim 1 and further including at least one further internal peripheral groove for accommodating a sealing ring.

12. In a coupling arrangement for producing a connection between first and second asbestos-cement pipes which is adapted to carry forces acting in the longitudinal direction of said pipes, comprising: a generally cylindrical coupling sleeve providing a bore therein for receiving the respective end portions of said first and second pipes to be connected together, at least one groove in the internal surface of said bore and extending peripherally in relation thereto, and a passage means communicating with said at least one peripherally extending groove and extending outwardly through the sleeve in at least substantially tangential relationship therewith; a coupling ring adapted to be fixedly connected to the respective end portion of said first and second pipes and which has a groove extending in the external surface thereof peripherally in relation thereto, whereby in the assembled condition of said first and second pipes and said coupling sleeve said at least one internal peripherally extending groove and said external peripherally extending groove co-operate to form a peripherally extending passage; and a flexible elongate coupling member adapted to be passed through said passage means in the sleeve into said peripherally extending passage, the co-operation of said peripherally extending grooves and said coupling member serving to hold the respective said pipe in said coupling sleeve, the improvement which provides that the coupling sleeve comprises a body portion of glass fiber roving material-reinforced synthetic resin, with the glass fiber roving material being so oriented that its greatest tensile strength is in the longitudinal direction of the coupling sleeve said body portion is a tubular member having a first and second end regions and being of smaller diameter at at least one of said end regions than in the other part of said tubular member, and further glass fiber roving material-reinforced synthetic resin around the body portion on the outside thereof at least in the region of said at least one internal peripherally extending groove, with said further glass fiber roving material being so oriented that its greatest tensile strength is in the peripheral direction of the coupling sleeve.

13. An arrangement as set forth in claim 12 and further including an internal lining layer provided on the internal surface of the bore of said coupling sleeve and extending peripherally around the sleeve and over at least a part of the length of the sleeve, said lining layer comprising glass fiber roving material embedded in synthetic resin, with the greatest tensile strength of the glass fiber roving material of said lining layer being oriented in the peripheral direction of the sleeve.

* * * * *

UNITED STATES PATENT AND TRADEMARK OFFICE
CERTIFICATE OF CORRECTION

PATENT NO. : 4,717,182
DATED : January 5, 1988
INVENTOR(S) : Uwe Behrens and Willi Keul It is certified that error appears in the above-identified patent and that said Letters Patent are hereby corrected as shown below:

Column 1, line 37, "coupled" should be --coupling--;

Column 6, line 12, "4" should be --3--; and

Column 7, lines 57-61, "said carrier body portion being a tubular member having first and second end regions and being of smaller diameter at at least one of said end regions than in the other part of said tubular member," should be moved to Column 8, line 10 after "sleeve,".

Signed and Sealed this

Fourteenth Day of June, 1988

Attest:

DONALD J. QUIGG

*Attesting Officer*    *Commissioner of Patents and Trademarks*